United States Patent
Wang et al.

(10) Patent No.: US 8,028,617 B2
(45) Date of Patent: Oct. 4, 2011

(54) EASILY-CLEANING MULTIFUNCTIONAL SOYBEAN MILK MAKER

(75) Inventors: Xu'ning Wang, Ji'nan (CN); Jun Wang, Ji'nan (CN); Yunjie Wei, Ji'nan (CN)

(73) Assignee: Shandong Joyoung Household Electrical Appliances Co., Ltd., Ji'nan (CN)

( * ) Notice: Subject to any disclaimer, the term of this patent is extended or adjusted under 35 U.S.C. 154(b) by 453 days.

(21) Appl. No.: 11/569,858

(22) PCT Filed: Nov. 28, 2005

(86) PCT No.: PCT/CN2005/002029
§ 371 (c)(1),
(2), (4) Date: Nov. 30, 2006

(87) PCT Pub. No.: WO2006/056141
PCT Pub. Date: Jun. 1, 2006

(65) Prior Publication Data
US 2009/0260524 A1    Oct. 22, 2009

(30) Foreign Application Priority Data
Nov. 29, 2004   (CN) .......................... 2004 1 0036418

(51) Int. Cl.
*G07F 9/10*   (2006.01)
(52) U.S. Cl. ................. 99/357; 99/495; 99/509; 99/510
(58) Field of Classification Search .................... 99/352, 99/353, 410, 483, 484, 486, 495, 536, 357, 99/509, 510
See application file for complete search history.

(56) References Cited

U.S. PATENT DOCUMENTS

| | | | | |
|---|---|---|---|---|
| 3,662,674 A | * | 5/1972 | Clausse | 99/283 |
| 5,701,810 A | * | 12/1997 | Nakai | 99/495 |
| 5,852,965 A | * | 12/1998 | Kim | 99/281 |
| 6,345,572 B1 | * | 2/2002 | Kao | 99/337 |
| 6,653,941 B2 | * | 11/2003 | Kim | 340/620 |
| 6,792,849 B1 | * | 9/2004 | Kim | 99/348 |
| 7,322,281 B2 | * | 1/2008 | Kim | 99/348 |

FOREIGN PATENT DOCUMENTS

| | | |
|---|---|---|
| CN | 2215880 Y | 2/1995 |
| CN | 2317770 Y | 5/1999 |
| CN | 1237402 A | 6/1999 |
| CN | 25401458 Y | 3/2003 |
| CN | 2542171 Y | 4/2003 |
| JP | 5-170801 | 7/1993 |
| JP | 11-89533 | 4/1999 |
| JP | 2002-355539 | 12/2002 |

* cited by examiner

Primary Examiner — Henry Yuen
Assistant Examiner — John Wasaff
(74) Attorney, Agent, or Firm — Workman Nydegger

(57) ABSTRACT

An easily-cleaning multifunctional soybean milk maker comprises a motor, a blade, a head unit, and a container, wherein a lower cover of the head unit being capped on the container, characterized in that a flow guider is securely fastened to the lower cover of the head unit, with the lower part of the flow guider immersed into water and the lower port of the flow guider being open. The blade fastened at the front end of the motor shaft is arranged within the flow guider and extends into water. Guiding holes are provided in the flow guider, and/or guiding channels in communication with the interior of the flow guider are provided on the lower cover of the head unit.

19 Claims, 5 Drawing Sheets

C-C

EASILY-CLEANING MULTIFUNCTIONAL SOYBEAN MILK MAKER

TECHNICAL FIELD

The present invention generally belongs to the field of kitchen utensil and relates to an easily-cleaning multifunctional soybean milk maker. More particularly, it relates to a device for making soybean milk, rice paste, soup of fruit and vegetable, and the like.

BACKGROUND OF THE INVENTION

A conventional home soybean milk maker comprises a motor, a blade, a head unit and a cylindrical container, wherein the lower cover of the head unit is capped on the cylindrical container. The device for crushing and slurry-making of such a conventional home soybean milk maker comprises a Filter mesh cover in which crushing blade is provided and the materials for making slurry are also contained. Therefore, it is difficult to clean the filter mesh cover. Especially it becomes even more difficult to clean the filter mesh cover when the filter mesh cover is heated up within the slurry during slurry boiling-up.

BRIEF SUMMARY OF THE INVENTION

The present invention provides an easily-cleaning multifunctional soybean milk maker in order to solve the problem that home soybean milk is difficult to be cleaned up.

The soybean milk maker according to the present invention comprises a motor, a blade, a head unit, and a container adapted for receiving water and materials for making slurry, wherein a lower cover of the head unit is capped on the container, characterized in that a flow guider is securely fastened to the lower cover of the head unit, with a lower part of the flow guider immersed into the water and a lower port of the flow guider being open. The blade fastened at a front end of the motor shaft is arranged within the flow guider and extends into the water. Guiding holes are provided in the flow guider. During a process of making slurry, the water and the materials for making slurry in a lower part of the container are raised upwardly inside the flow guider, and the materials for making slurry are crushed by the blade and expelled out of the flow guider into the container with water through the guiding holes.

Another soybean milk maker according to the present invention comprises a motor, a blade, a head unit, and a container adapted for receiving water and materials for making slurry, wherein a lower cover of the head unit being capped on the container, characterized in that a flow guider is securely fastened to the lower cover of the head unit, with a lower part of the flow guider immersed into the water and a lower port of the flow guider being open. The blade fastened at a front end of the motor shaft is arranged within the flow guider and extends into the water. Guiding channels in communication with an interior of the flow guider are provided on the lower cover of the head unit. During a process of making slurry, the water and the materials for making slurry in a lower part of the container are raised upwardly inside the flow guider, and the materials for making slurry are crushed by the blade and expelled out of the flow guider into the container with water through the guiding channels. Moreover, guiding holes may also be provided in the flow guider.

In the easily-cleaning multifunctional soybean milk maker according to the present invention, the flow guider is securely fastened to the lower cover of the head unit. Similar to the installation of the filter mesh cover of the conventional soybean milk maker, the upper end of the flow guider of the present invention may be screwed onto the lower cover of the head unit in a direction and be unscrewed from the lower cover in an opposite direction. The lower part of the flow guider is open, and the blade fastened at the front end of the motor shaft is arranged within the flow guider and extends into water. Guiding bores may be provided in the flow guider, or guiding channels communicating with the interior of the flow guider may be provided on the lower cover of the head unit. In the case that guiding channels communicating with the interior of the flow guider are provided on the lower end of the head unit, guiding holes may also be provided on the flow guider.

When using the easily-cleaning multifunctional soybean milk maker according to the present invention, water and materials for making slurry are firstly placed in the container; then the lower cover of the head unit, with the flow guider fixed thereto, is capped onto the container, ensuring the blade is immersed in the water; and the power is turned on to make slurry. During the process of making slurry, as a result of the rotational movement of the blade arranged within the flow guide and extending into the water, water and materials for making slurry in the lower part of the container are raised upwardly inside the flow guider, and the materials for making slurry are crushed by the blade and expelled out of the flow guider into the container with water through the guiding holes, or the guiding channels, or both the guiding holes and the guiding channels. In this way, water and crashed materials for making slurry are cycled repeatedly between the container and the flow guider so as to accomplish the process of making slurry. According to the present invention, normally after the processes of making slurry or boiling slurry are finished, soybean milk may be poured out from the container directly after the slurry has been settled down for a short while, and the dregs are left within the container. Alternatively, as shown in drawings, a conventional filter mesh may be provided at the outlet of the container in order to filter off the soybean dregs, or an additional filtering device may be provided at the inlet of a milk receptacle so as to filter off soybean dregs. The filter mesh or the filtering device can be easily cleaned up. The flow guider of the easily-cleaning multifunctional soybean milk maker according to the present invention is open in the lower port, thus the inner and outer wall of the flow guider can be easily cleaned, therefore it is substantially different from the conventional filter mesh cover, though guiding holes are provided therein. At the same time, different from merely getting crushed and making slurry within the filter mesh cover in a prior art soybean milk maker, in the present invention the materials for making slurry is extensively cycled together with water between the container and the flow guider to get crushed and make slurry. Therefore, the effect of crashing and making slurry is better, and the emanation of nutrition of the materials for making slurry is more sufficient. Since the materials for making slurry are placed directly into the container, the soybean milk maker can be installed, used and cleaned in an easier way. The flow guider is provided with relatively thick walls, therefore it is relatively free from being cut by the rotating blade. The easily-cleaning multifunctional soybean milk maker according to the present invention is not only used to make soybean milk, but also adapted to make food or drinks, such as rice paste, soup of fruit and vegetable, and the like.

Figure 1:
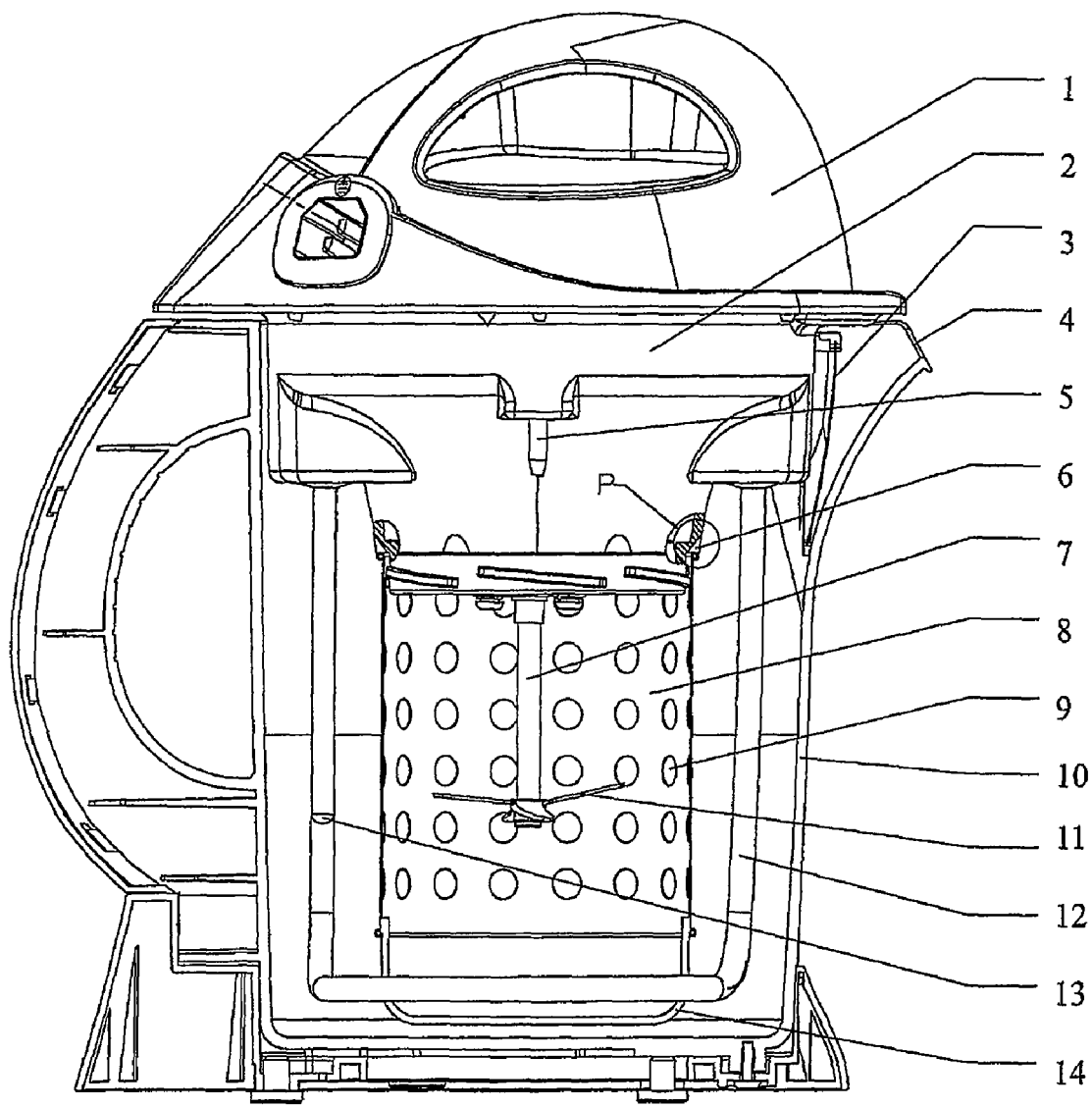
FIG. 1 illustrates the configuration of one preferred embodiment of the easily-cleaning multifunctional soybean milk maker according to the present invention.
Figure 2:
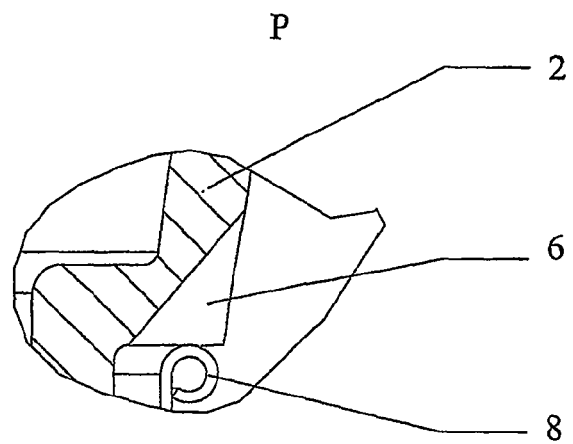
FIG. 2 illustrates an enlarged partial view of an area P in FIG. 1.

LIST OF REFERENCE NUMERALS 1 upper cover of the head unit
2 lower cover of the head unit
3 filter mesh
4 outlet
5 overflow prevention electrode
6 guiding channel
7 motor shaft
8 flow guider
9 guiding bore
10 cylindrical container
11 blade
12 electrical heating tube
13 temperature sensor
14 handle of the flow guider
15 crushing rib
16 necking.
H1 the distance between the lower edge of the flow guider 8 and the bottom of the cylindrical container 10
H2 the distance between the blade 11 and the lower edge of the flow guider 8
H3 the distance between the guiding bore 9 and the upper edge of the flow guider 8.

DETAILED DESCRIPTION OF THE INVENTION

Embodiment 1

As shown in FIGS. 1 to 8, a preferred embodiment of the easily-cleaning multifunctional soybean milk maker according to the present invention comprises a motor, a blade, a head unit, a cylindrical container 10, a heating device, a temperature sensor 13, an overflow prevention electrode 5 and circuit control apparatus, wherein the motor and the circuit control apparatus are both arranged in the head unit, and the lower cover 2 of the head unit is capped on the cylindrical container 10, characterized in that a flow guider 8 is securely fastened to the lower cover 2 of the head unit, with the lower part of the flow guider 8 immersed into water and the lower port of the flow guider 8 being open; the blade 11 fastened at the front end of the motor shaft 7 is arranged within the flow guider 8 and extends into water; and guiding holes 9 are provided in the flow guider 8. A filter mesh 3 may be provided at the outlet 4 of the cylindrical container 10. Guiding holes 9 may be shaped as being circular, elliptical and rectangular, etc. The heating device may be configured as an electrical heating tube 12 shown in Figures, but also may in the form of an electrical heating plate, an electro-magnetic heating device, and the like. The temperature sensor may be a temperature sensor 13 fixed to the lower cover 2 of the head unit and immersed into water directly as shown in the Figures. Optionally, the temperature sensor may also extend into water from a lower part of the cylindrical container 10 and measure the temperature of water directly, or it may measure the temperature of water indirectly through the outer wall of the cylindrical container. A handle 14 of the flow guider is preferably provided at the lower end of the flow guider 8 so as to facilitate the installation or disassembly of the flow guider 8, as shown in the Figures. Meanwhile, in case that the flow guider 8 falls off from the lower cover 2 of the head unit accidentally during operation, the handle 14 of the flow guider will contacts the bottom of the cylindrical container 10 and provides a structural support for the flow guider so as to prevent the flow guider 8 from being cut by the rotating blade 11.

Figure 7:
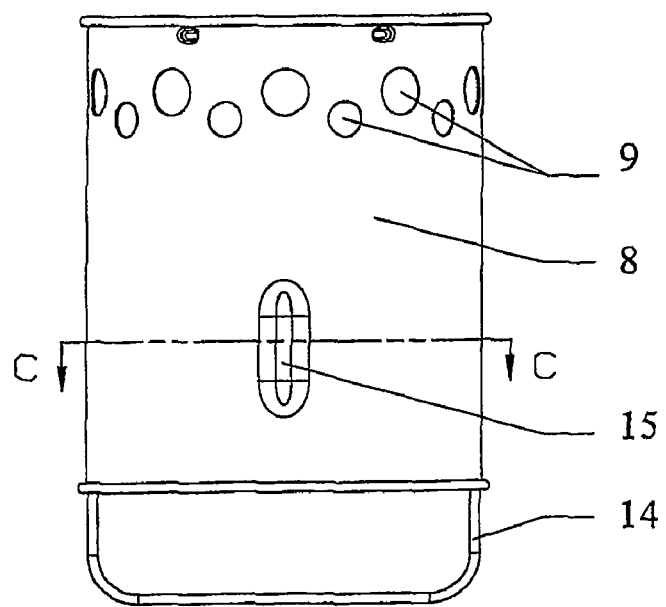
FIG. 7 illustrates the configuration of the embodiment of the flow guider of the easily-cleaning multifunctional soybean milk maker according to the present invention.
Figure 8:
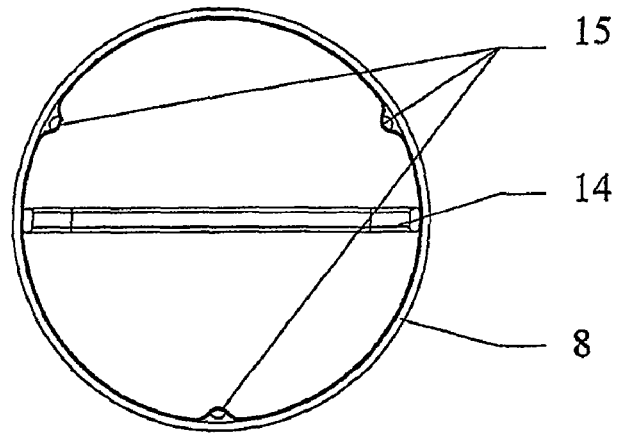
FIG. 8 illustrates a section view taken along the line C-C in FIG. 7.

As shown in FIGS. 7 and 8, crushing ribs 15 are provided on the flow guider 8 near the blade H1, whereby the materials for making slurry can be crushed and cycled better. The blade 11 may be configured as a flat blade, a cross blade, a serrated blade, and the like.

Figure 3:
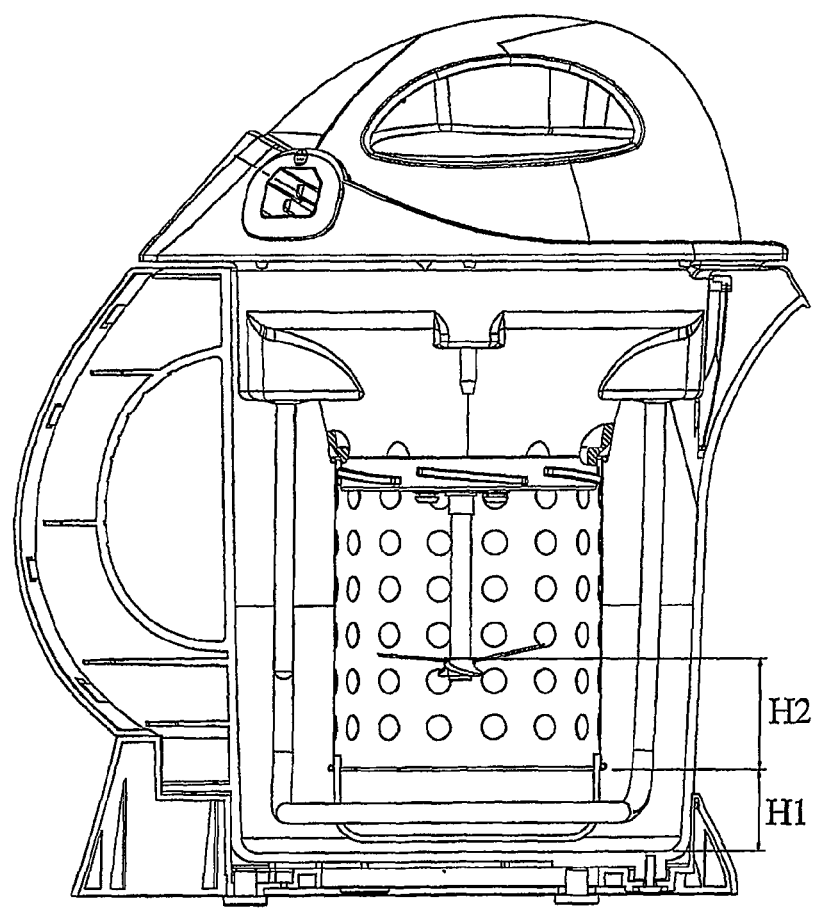
FIG. 3 illustrates the configuration of the preferred embodiment of the easily-cleaning multifunctional soybean milk maker according to the present invention.

As shown in FIG. 3, the distance H1 between the lower edge of the flow guider 8 immersed in the water and the bottom of the cylindrical container 10 is equal to or greater than 3 mm. This distance is adapted for making rice paste, soybean milk, soup of fruit and vegetable and the like. When the distance H1 between the lower edge of the flow guider 8 and the bottom of the cylindrical container 10 is between 15~25 mm, the effect of making soybean milk will be better.

As shown in FIG. 3, when the distance H2 between the blade 11 fixed at the front end of the motor shaft 7 and the lower edge of the flow guider 8 is in the range of ¼ to ⅓ of the total height of the flow guider 8 (excluding the height of the handle 14 of the flow guider), the materials for making slurry may be better crushed and cycled.

Figure 5:
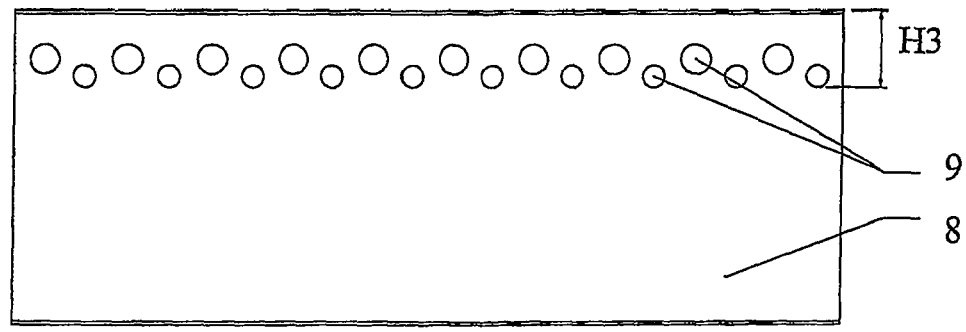
FIG. 5 illustrates the developed representation of an embodiment of the flow guider of the easily-cleaning multifunctional soybean milk maker according to the present invention.
Figure 6:
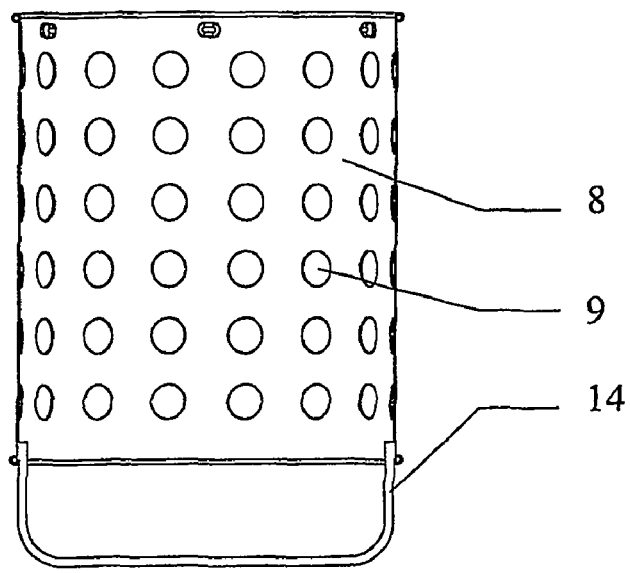
FIG. 6 illustrates the configuration of the embodiment of the flow guider of the easily-cleaning multifunctional soybean milk maker according to the present invention.

As shown in FIG. 5, the guiding holes 9 are provided in the upper part of the flow guider 8, and when the distance H3 between the guiding holes 9 and the upper edge of the flow guider 8 is in the range of ⅓ of the total height of the flow guider 8 (excluding the height of the handle 14 of the flow guider), the materials for making slurry may be better crushed and cycled.

Figure 9:
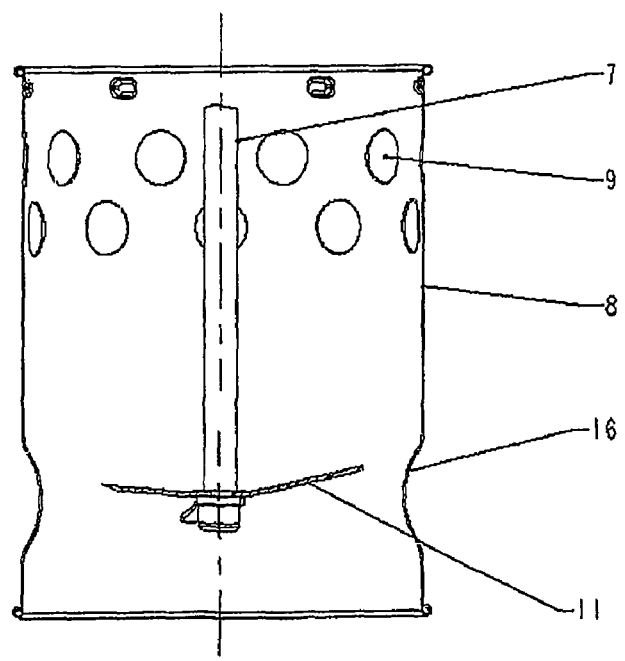
FIG. 9 illustrates the configuration of the necking of the flow guider of the easily-cleaning multifunctional soybean milk maker according to the present invention.

As shown in FIG. 9, a necking 16 is provided at the lower part of the flow guider 8, corresponding to the horizontal position of the blade 11. The material in the flow guider may be urged to flow upwardly when driven by the blade 11 so as to be crushed better.

The operation of the above preferred embodiment of the easily-cleaning multifunctional soybean milk maker according to the present invention is as follows. Firstly, water and the materials for making slurry are placed in the cylindrical container 10; then the lower cover 2 of the head unit, with the flow guider 8 fixed thereto, is capped onto the cylindrical container 10, ensuring the blade 11 is immersed in water; then the power is turned on; when the temperature of the water measured by the temperature sensor 13 is transmitted to the circuit control apparatus, the soybean milk maker automatically accomplishes preheating, slurry making and milk boiling under the control of the preprogrammed circuit control apparatus. During the process of making slurry, as a result of the rotational movement of the blade 11 arranged within the flow guide 8 and extending into the water, water and materials for making slurry in the lower part of the cylindrical container 10 are raised upwardly inside the flow guider 8. The materials for making slurry are crushed by the blade 11 and expelled out of the flow guider 8 into the cylindrical container 10 with water through the guiding holes 9 In this way, water and crashed material are cycled repeatedly between the cylindrical container 10 and the flow guider 8 to accomplish the process of making slurry. In the process of making slurry, normally after the process of boiling slurry is finished, soybean milk is poured out from the cylindrical container 10 directly after the slurry has been settled down for a short while, and the dregs are left within the cylindrical container 10. Alternatively, as shown in the Figures, a conventional filter mesh 3 may be provided at the outlet 4 of the cylindrical container 10 so as to filter off the soybean dregs, or an additional filtering device may be provided at the inlet of a milk receptacle in order to filter off soybean dregs. It is easy to clean the filter mesh or the filtering device, as they are not heated up within soybean milk.

Embodiment 2

Figure 4:
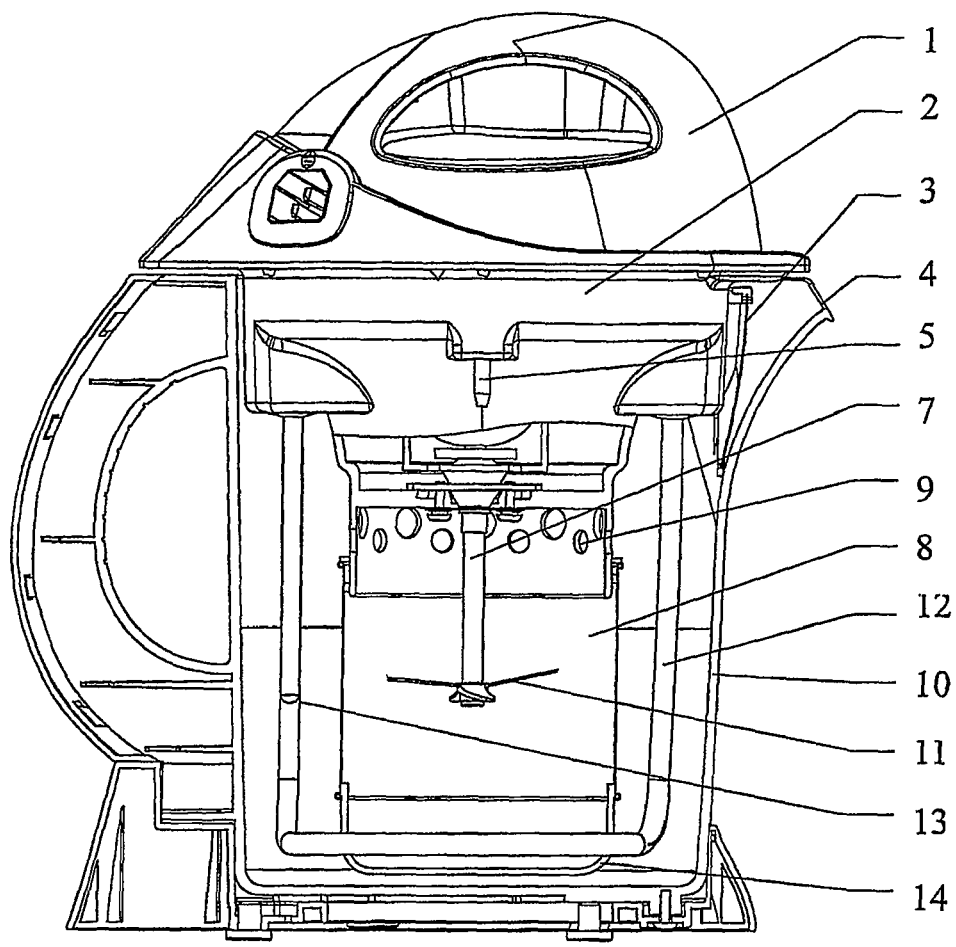
FIG. 4 illustrates the configuration of another preferred embodiment of the easily-cleaning multifunctional soybean milk maker according to the present invention.

As shown in FIGS. 1 to 8, another preferred embodiment of the easily-cleaning multifunctional soybean milk maker according to the present invention comprises a motor, a blade, a head unit, a cylindrical container 10, a heating device, a temperature sensor 13, an overflow prevention electrode 5 and a circuit control apparatus, wherein the motor and the circuit control apparatus are both arranged in the head unit, and the lower cover 2 of the head unit is capped on the cylindrical container 10, characterized in that a flow guider 8 is securely fastened to the lower cover 2 of the head unit, with the lower part of the flow guider 8 immersed into water and the lower port of the flow guider 8 being open, the blade 11 fastened at the front end of the motor shaft 7 is arranged within the flow guider 8 and extends into water, and guiding channels 6 in communication with the interior of the flow guider 8 are arranged on the lower cover 2 of the head unit. Furthermore, as shown in FIG. 4, as a variation of the guiding channels 6 arranged on the lower cover 2 of the head unit, an annular body provided with guiding holes 9 is extended downwardly from the lower end of the lower cover 2 of the head unit, with the upper end of the flow guider 8 fastened on the lower part of the annular body. Such a variation also falls within the protection scope of the present invention. Meanwhile, guiding holes 9 may be also provided on the flow guider 8, and the guiding holes 9 may be shaped as being circular, elliptical and rectangular, etc.

As described in embodiment 1, a filter mesh 3 may be provided at the outlet 4 of the cylindrical container 10. The heating device may be configured as an electrical heating tube 12 shown in the Figures, but also may in the form of an electrical heating plate, an electro-magnetic heating device, and the like. The temperature sensor may be a temperature sensor 13 fixed to the lower cover 2 of the head unit and immersed into water directly as shown in the Figures. Optionally, the temperature sensor may also extend into water from a lower part of the cylindrical container 10 and measure the temperature of water directly, or it may measure the temperature of water indirectly through the outer wall of the cylindrical container. A handle 14 of the flow guider is preferably provided at the lower end of the flow guider 8 so as to facilitate the installation or disassembly of the flow guider 8, as shown in the Figures. Meanwhile, in case that the flow guider 8 falls off from the lower cover 2 of the head unit accidentally during operation, the handle 14 of the flow guider will contacts the bottom of the cylindrical container 10 and provides a structural support for the flow guider so as to prevent the flow guider 8 from being cut by the rotating blade 11. As shown in FIGS. 7 and 8, crushing ribs 15 are provided on the flow guider 8 near the blade 11, whereby the materials for making slurry may be better crushed and cycled.

As shown in FIG. 3, the distance H1 between the lower edge of the flow guider 8 immersed in the water and the bottom of the cylindrical container 10 is equal to or greater than 3 mm. This distance is adapted for making rice paste, soybean milk, soup of fruit and vegetable, and the like. When the distance H1 between the lower edge of the flow guider 8 and the bottom of the cylindrical container 10 is between 15~25 mm, the effect of making soybean milk will be better.

As shown in FIG. 3, when the distance H2 between the blade 11 fixed at the front end of the motor shaft 7 and the lower edge of the flow guider 8 is in the range of ¼ to ⅓ of the total height of the flow guider 8 (excluding the height of the handle 14 of the flow guider), the materials for making slurry may be better crushed and cycled. The blade 11 may be configured as a flat blade, a cross blade, a serrated blade, and the like.

As shown in FIG. 9, a necking 16 is provided at the lower part of the flow guider 8, corresponding to the horizontal position of the blade 11. Its function is similar to that of the Embodiment 1, and will not be discussed further.

This embodiment of the easily-cleaning multifunctional soybean milk maker operates in a similar way as the Embodiment 1. The only difference is that during the process of slurry making, as a result of the rotational movement of the blade 11 arranged within the flow guide 8 and extended into the water, water and materials for making slurry in the lower part of the cylindrical container 10 are raised upwardly inside the flow guider 8. The materials for making slurry are crushed by the blade 11 and expelled out of the flow guider 8 into the cylindrical container 10 with water through the guiding channel 6 or both the guiding channels 6 and the guiding holes 9. In this way, water and crashed materials are cycled repeatedly between the cylindrical container 10 and the flow guider 8 to accomplish the process of making slurry.

Particularly, for soybean milk maker that makes raw soybean milk only or makes and boils slurry separately, the soybean milk maker configured according to the present invention may fully satisfy the demand to make raw soybean milk. Water and the material for making slurry are placed in the cylindrical container 10; then the lower cover 2 of the head unit, with the flow guider 8 fixed thereto, is capped onto the cylindrical container 10, ensuring the blade 11 is immersed in the water; finally, the power is turned on, and the soybean milk maker can accomplish soybean milk production automatically according to the programmed control. Soybean milk may be poured out from the cylindrical container 10 directly after the slurry has been settled down for a short while, and the dregs are left within the cylindrical container 10. Alternatively, as shown in the Figures, a conventional filter mesh 3 may be provided at the outlet 4 of the cylindrical container 10 so as to filter off the soybean dregs, or an additional filtering device may be provided at the inlet of a milk receptacle in order to filter off soybean dregs. The filter mesh or the filtering device may be easily cleaned up. Soybean milk poured out from the soybean milk maker may be separately boiled up. The skilled in the art may easily carry out the present invention in the slurry production part with reference to the drawings, therefore, no additional reference drawings are provided.

What is claimed is:

1. A soybean milk maker comprising:
a motor, a blade, a head unit, and a container adapted for receiving water and for receiving raw materials for making slurry, the raw materials for making slurry comprising soybeans, wherein a lower cover of the head unit is capped on the container, a flow guider is securely fastened to the lower cover of the head unit, with a lower part of the flow guider immersed into the water and a lower part of the flow guider being open and, and in that the blade fastened at a front end of a motor shaft driven by the motor is arranged within the flow guider and extends into the water, and guiding holes are provided in the flow guider,
wherein the blade crashes the raw materials for making slurry and the guiding holes are configured for expelling the crashed raw materials out of the flow guider and back into the container, the crashed raw materials including dregs,
wherein the water and the raw materials for making slurry in a lower part of the container are capable of being raised upwardly from the container to inside the flow guider through the open lower part of the flow guider, wherein the open lower part provides an unimpeded flow of the water and the raw materials for making slurry into an interior of the flow guider to be crashed by the blade.

2. The soybean milk maker according to claim 1, wherein a distance H1 between a lower edge of the flow guider immersed in the water and a bottom of the container is equal to or greater than about 3 mm.

3. The soybean milk maker according to claim 2, wherein the guiding holes are arranged in an upper portion of the flow guider, and a distance H3 between guiding holes and an upper edge of the flow guider is in the range of about ⅓ of a total height of the flow guider.

4. The soybean milk maker according to claim 2, wherein the distance H1 between the lower edge of the flow guider immersed in the water and the bottom of the container is between about 15 mm and about 25 mm.

5. The soybean milk maker according to claim 4, wherein the guiding holes are arranged in an upper portion of the flow guider, and a distance H3 between guiding holes and an upper edge of the flow guider is in the range of about ⅓ of a total height of the flow guider.

6. The soybean milk maker according to claim 1, wherein a distance H2 between the blade fixed at the front end of the motor shaft and a lower edge of the flow guider is in the range of about ¼ to about ⅓ of a total height of the flow guider.

7. The soybean milk maker according to claim 6, wherein the guiding holes are arranged in an upper portion of the flow guider, and a distance H3 between guiding holes and an upper edge of the flow guider is in the range of about ⅓ of a total height of the flow guider.

8. The soybean milk maker according to claim 1, wherein the guiding holes are arranged in an upper portion of the flow guider, and a distance H3 between guiding holes and an upper edge of the flow guider is in the range of about ⅓ of a total height of the flow guider.

9. The soybean milk maker according to claim 8, wherein a necking is provided at the lower part of the flow guider corresponding to a horizontal position of the blade.

10. A soybean milk maker comprising:
a motor, a blade, a head unit, and a container adapted for receiving water and for receiving raw materials for making slurry, the raw materials for making slurry comprising soybeans, wherein a lower cover of the head unit is capped on the container, characterized in that a flow guider is securely fastened to the lower cover of the head unit, with a lower part of the flow guider immersed into the water and a lower port of the flow guider being open, and in that the blade fastened at a front end of a motor shaft driven by the motor is arranged within the flow guider and extended into the water, and guiding channels in communication with an interior of the flow guider are provided on the lower cover of the head unit;
wherein the blade crashes the raw material for making slurry and the guiding channels are configured for expelling the crashed raw materials out of the flow guider and back into the container, the crashed raw materials including dregs,
wherein the water and the raw materials for making slurry in a lower part of the container are capable of being raised upwardly from the container to inside the flow guider through the open lower portion of the flow guider, wherein the open lower part provides an unimpeded flow of the water and the raw materials for making slurry into an interior of the flow guider to be crashed by the blade.

11. The soybean milk maker according to claim 10, wherein the guiding holes for expelling the raw materials for making slurry out of the flow guider are also provided in the flow guider.

12. The soybean milk maker according to claim 11, wherein a distance H1 between a lower edge of the flow guider immersed in the water and a bottom of the container is equal to or greater than about 3 mm.

13. The soybean milk maker according to claim 12, wherein the distance H1 between the lower edge of the flow guider immersed in the water and the bottom of the container is between about 15 mm and about 25 mm.

14. The soybean milk maker according to claim 10, wherein a distance H2 between the blade fixed at the front end of the motor shaft and a lower edge of the flow guider is in the range of about ¼ to about ⅓ of a total height of the flow guider.

15. The soybean milk maker according to claim 10, wherein a necking is provided at the lower part of the flow guider corresponding to a horizontal position of the blade.

16. The soybean milk maker according to claim 10, wherein a distance H1 between a lower edge of the flow guider immersed in the water and a bottom of the container is equal to or greater than about 3 mm.

17. The soybean milk maker according to claim 16, wherein the distance H1 between the lower edge of the flow guider immersed in the water and the bottom of the container is between about 15 mm and about 25 mm.

18. The soybean milk maker according to claim 10, wherein a distance H2 between the blade fixed at the front end of the motor shaft and a lower edge of the flow guider is in the range of about ¼ to about ⅓ of a total height of the flow guider.

19. The soybean milk maker according to claim 10, wherein a necking is provided at the lower part of the flow guider corresponding to a horizontal position of the blade.

* * * * *